United States Patent

[11] 3,591,145

| [72] | Inventors | Donald Ainsworth;<br>Trevor Blewett, both of Morley, England |
|---|---|---|
| [21] | Appl. No. | 22,187 |
| [22] | Filed | Mar. 24, 1970 |
| [45] | Patented | July 6, 1971 |
| [73] | Assignee | Vallance & Co. (Morley) Limited<br>Morley, England<br>Continuation-in-part of application Ser. No. 743,209, July 8, 1968, now Patent No. 3,536,300. |

[54] METHOD FOR CONTINUOUSLY MIXING POWDERS AND OILS
3 Claims, 8 Drawing Figs.

[52] U.S. Cl. ............................................. 259/6, 259/26
[51] Int. Cl. ............................................. B01f 7/08
[50] Field of Search ................................. 259/9, 10, 6, 7, 5, 18, 21, 22, 24, 25, 26, 45, 46, 109, 110, 104, 103

[56] References Cited
UNITED STATES PATENTS

| 1,522,386 | 1/1925 | Parsons | 259/9 X |
| 2,016,920 | 10/1935 | Fisher | 259/25 |
| 2,242,364 | 5/1941 | Montanari | 259/9 X |
| 2,868,517 | 1/1959 | Lasch | 259/6 |
| 2,926,619 | 3/1960 | Kruder | 259/9 X |
| 3,288,443 | 11/1966 | Lynch | 259/9 |
| 3,323,570 | 6/1967 | Tullock | 259/9 X |

Primary Examiner—Robert W. Jenkins
Attorney—Abraham A. Saffitz

ABSTRACT: Apparatus for the continuous production of putty from the powdered and liquid constituents thereof wherein the constituents are fed continuously in measured proportions to a preliminary mixing trough in which a rotary screw device agitates and mixes the constituents and conveys them along the trough into an extrusion chamber in which a second rotary screw device further agitates the mix and forces it serially through at least two series of restricted orifices in a plurality of multiorificed plates spaced transversely along the extrusion chamber and thence through a delivery outlet as a continuous flow, said second rotary screw device preferably cooperating with one or more of said extrusion plates and with longitudinally extending projections and recess of the inner wall of said extrusion chamber to exert also a shearing action on the mix.

INVENTORS
DONALD AINSWORTH
TREVOR BLEWETT

BY Abraham A. Saffitz
ATTORNEY

METHOD FOR CONTINUOUSLY MIXING POWDERS AND OILS

This invention relates to the mixing of powdered and liquid constituents of putty in the manufacture thereof and constitutes a continuation-in-part of our application Ser. No. 743,209 filed July 8, 1968 now U.S. Pat. No. 3,536,300.

The usual mixing method now used for manufacturing putty is to place a batch of powder and oil in a circular milling trough and to force the oil gradually into close admixture with the powder by means of a heavy rotary edge runner. This process takes up to half an hour to mix one batch which is then removed from the trough manually and replaced by a fresh batch of material.

It is the chief object of the present invention to provide a method and apparatus for the continuous production of putty from the powdered and liquid constituents thereof, and a further object is to achieve a considerable reduction in the production time for any given quantity compared with the time required using the traditional method referred to above.

It is well known in the art of mixing materials of a granular or powdered nature with thin liquids such as water, to submit the constituents to the action of one or more rotary screw devices with mixer arms which exert a mixing and conveying action on the constituents, also to extrude the mixture through restricted apertures to produce a further mixing action. In dough-mixing machines for example the object is to exert a kneading action for the express purpose of introducing air into the mixture to produce a light dough, whereas this result must be avoided in the manufacture of putty. Moreover, in many of the known mixing machines, rotary cutting knives are used to chop up the partly mixed materials.

Such known or proposed machine have never, so far as we are aware, been used for the production of putty and we have found it necessary to evolve a new method and apparatus for manufacturing putty in a continuous stream. The reason for this can be explained as follows. The main ingredients of putty are oils which act as binders and powders which are the fillers. Various kinds of oils may be used, such as vegetable oils (e.g. linseed, soya bean, castor), mineral oils, mineral oil extracts, liquid resins of an oily nature or combinations of any of the above. Various kinds of powders other than whiting (chalk) may be used as ingredients of the putty, such as china clay, talc, limestone flour, asbestos, titanium dioxide. These materials are finely powdered, for example in the case of whiting this may include particles of a size ranging from 150 microns down to 2 microns or less, the mixture of different sizes of particles helping to produce a product having plenty of body but a minimum of voids within it.

To produce a good quality putty, the oil and finely powdered material must be intimately mixed together. These materials however, are mutually incompatible in the sense that they are very difficult to mix sufficiently thoroughly to ensure that they form a substantially stable mixture which will not subsequently separate into its individual ingredients. Any mere mechanical mixing action is insufficient by itself and must be followed by a squeezing action which causes every minute particle of the powder to be moved relative to its adjacent particles to enable the oil to contact every particle and to form an oil coating round it. This squeezing action is termed in this specification and in the appended claims a "shearing" action and is to be distinguished from a chopping or cutting action.

According to the present invention there is provided a method of continuously mixing powdered and liquid constituents of putty and delivering the putty in the form of a stream thereof, and also an apparatus for carrying out this method, and such method and apparatus are described and explained in the following specification and the scope of the invention for which protection is sought is defined in the appended claim.

In order that the present invention may be fully and clearly understood the same will now be described with reference to the accompanying drawings which illustrate by way of example one construction of apparatus for carrying out the invention to provide for the continuous production of putty.

Figure 3:
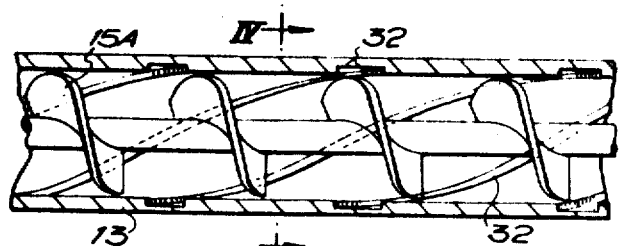
Figure 4:
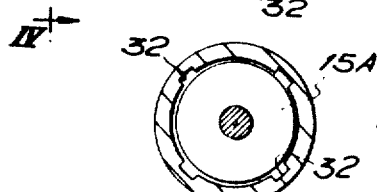
Figure 5:
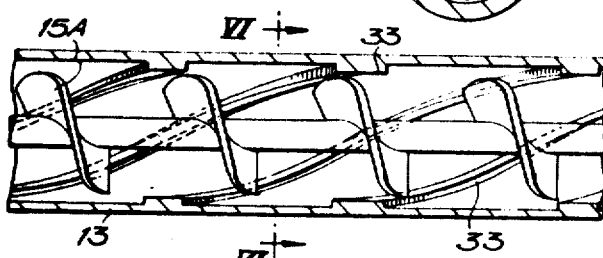
Figure 6:
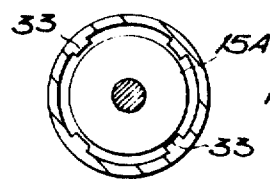
Figure 7:
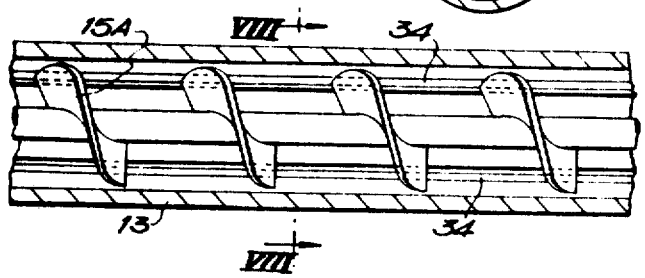
Figure 8:
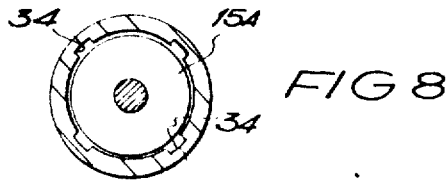

FIGS. 3, 5 and 7 are fragmentary longitudinal sections through the extrusion cylinder and its screw means showing three modifications; and FIGS. 4, 6 and 8 are sections taken respectively on the lines IV-IV, VI-VI and VIII-VIII in FIGS. 3, 5 and 7.

Figure 1:
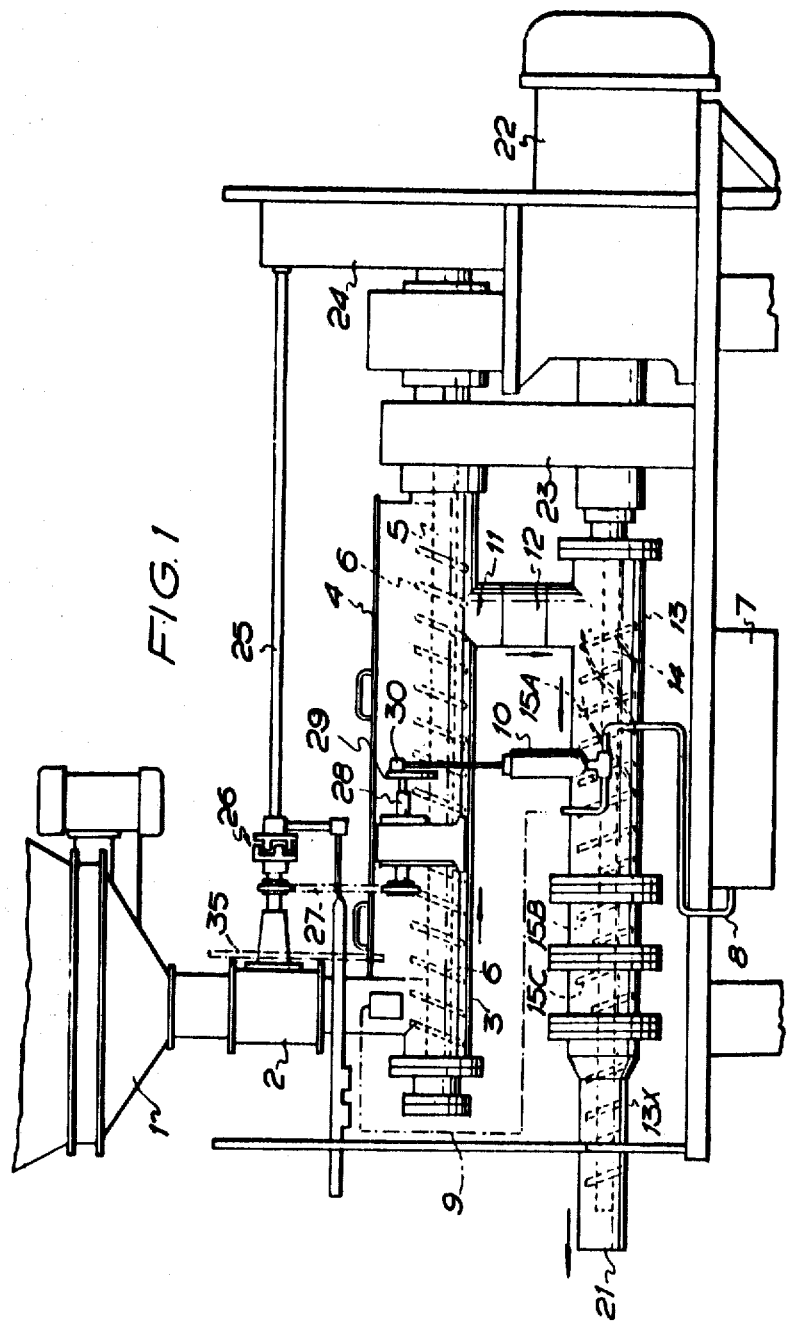
FIG. 1 represents an elevation of the apparatus.

As shown in FIG. 1 powdered whiting in fed from a hopper 1 through a rotary measuring feeder 2 into one end of a horizontal trough 3. This trough has a curved bottom and a removable top cover 4 for inspection and cleaning purposes. Extending through this trough is a rotatable mixer shaft 5 around which are secured in a spiral path a series of mixer arms 6 which are so shaped and angled as to cooperate also with the trough bottom to act as screw conveyor.

Linseed oil from a tank 7 is pumped through pipes 8, 9 by a reciprocating pump 10 into the feed end of trough 3 at a predetermined measured rate. The proportions will be of the order of 87 percent whiting to 13 percent oil by weight. If desired pigments may be gravity fed through a pipe or pipes 35 into trough 3.

The mixer arms 6 agitate and premix the whiting and oil the broken form of this screw helping to prevent the mixture from jamming in the trough. At the same time the arms convey the mixture to the delivery end of the trough where it is pushed through a bottom outlet 11 and transfer duct 12 into the feed end of a horizontal extrusion cylinder 13 which conveniently extends below and parallel to the trough.

Extending through this cylinder is a rotatable extruder shaft 14 on which is secured a broken screw forming a series of angled paddles 15A, 15B, 15C which work close to the wall of the cylinder. Spanning the cylinder are two axially spaced apart multiorificed extrusion plates 16, 17 having a plurality of small holes or orifices which may be, for example, 5 mm. diameter in plate 16 and 8 mm. diameter in plate 17. The diameter of the holes in extrusion plate 16 is smaller than than of the holes in extrusion plate 17, the smaller holes building up the extrusion pressure in the first portion of the cylinder and the larger holes assuring the continuous flow of pressurized powdered and liquid constituents without creating an undesirable reduction in the particle size of the powdered ingredients. The shaft 14 passes through these plates 16, 17 and is journaled in a bearing 18 in a spider support 19 and its outer end carries an Archimedian delivery screw 20 which works in a reduced diameter extension 13X of the cylinder 13 having a delivery outlet 21.

The paddles 15A are arranged to form a broken screw so as to give a further agitating action and also to force the mixture through the holes in plate 16, but without risk of the screw jamming or the pressure rising to a dangerous value. The last paddles 15A may work so close to the plate 16 as to exert a shearing action on the mixture to further the mixing operation, and the paddles 15B may cooperate similarly with the plate 17, these paddles in effect smearing the mixture across the entrances to the holes.

Figure 2:
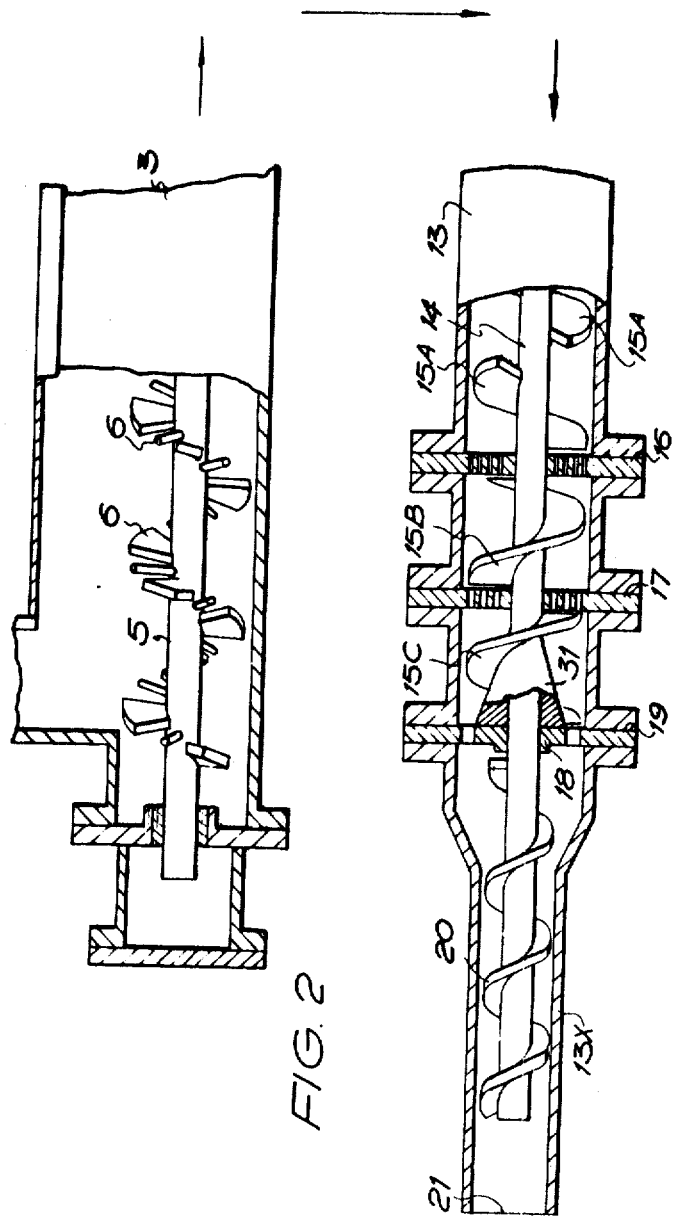
FIG. 2 illustrates by fragmentary longitudinal sections the construction of two screwlike devices for mixing and extruding the ingredients.

In FIG. 2 there is shown a pressure cone 31 secured on the shaft 14. This acts to compress the mixture as it approaches the openings in the spider support 19 and also protects the bearing 18 from the longitudinal extrusion pressure.

The extrusion cylinder 13, instead of having a smooth cylindrical inner wall, is provided with flutes, channels or ribs extending paraxially or helically so as to cooperate with some at least of the paddles to promote the movement of the mixture along the cylinder, to prevent the mixture from binding around the shaft 14 and merely rotating without feeding the mixture along, and also to exert a high pressure on the mixture and effect a shearing action thereon. Examples of such longitudinally extending projections and recesses are illustrated in FIGS. 3 to 8.

FIGS. 3 and 4 show multiple flutes 32 extending helically in the opposite sense to that of the paddles.

FIGS. 7 and 8 shown flutes 34 parallel to the cylinder axis.

The two shafts 5, 14 are rotated at the same speed through any suitable driving mechanism. In FIG. 1 there is indicated a motor 22 driving the two shafts through transmission gearing in a housing 23. An auxiliary transmission device in a housing 42 transmits a drive through shaft 25 and clutch 26 to the measuring feeder 2 and also through a chain and sprocket connection 27 to the shaft 28 of a crank disc 29 whose crank arm 30 operates the pump 10.

By the above described construction of apparatus the ingredients are premixed by a thorough agitating and mixing action in trough 3 and the mixture is transferred to the cylinder 13 where the mixture is further agitated and mixed, sheared, forced through the holes in the successive plates 16, 17 and finally forced from the delivery outlay 21 as a continuous flow of compacted putty; the path of the mixture being indicated by the arrows in the drawings. This continuous production can proceed so long as the supply of whiting and oil is maintained, and the time of production is greatly reduced, due to the efficient mixing and power extrusion actions.

It must be appreciated that, besides using a preliminary mechanical mixing and agitating operation to introduce the oil into the powder with a fairly uniform distribution, it is also necessary to use the "shearing" operation as hereinbefore defined. In this latter operation the preliminary mixture must be subjected to a considerable pressure whilst being thoroughly turned about and yet must permit of continuous production of the putty in an unbroken stream. This is achieved in the extrusion cylinder 13 where a high pressure of the order of several thousand pounds per square inch is exerted on the mixture by the paddles operating therein to produce what may be termed a hydraulic shear effect. The orificed plates 16, 17 provide a resistance to the passage of the mixture to ensure the necessary buildup of pressure, besides their function already described of cooperating with the adjacent paddles to effect the further smearing and shearing action on the mixture as it is forced through the holes in the plates.

The shearing action is amplified by the "working" of the mixture caused by the interaction between the pressurizing screw and the recesses and projections along the wall of cylinder 13. The high pressure produced and this helps to produce the necessary intimate contact between the powder particles and the oil.

Whilst the premixing trough and the extrusion cylinder have been described and illustrated as arranged one below the other to economize in floorspace, it will be clear that they might be arranged in line or in any other desired relationship which will enable the continuous production method of this invention to be carried out.

We claim:

1. A method of continuously mixing powdered and liquid constituents of putty and delivering the putty in the form of a stream thereof, comprising the steps of continuously feeding measured quantities of the constituents at a controlled rate to a feeding end of a premixing chamber, mechanically agitating and mixing said constituents in said premixing chamber whilst simultaneously conveying them therethrough with a helical mixing and conveying movement, transferring the resultant preliminary mixture continuously into an extrusion chamber, subjecting the mixture to a further mixing action and to a shearing action whilst being propelled along said extrusion chamber under pressure, then continuously forcing the mixture by a screw action serially through at least two series of restricted orifices to produce a further intermixing, the orifices increasing in size in each successive series in the direction of travel of the mixture, and thereafter forcing the putty continuously from an outlet in compacted form.

2. The method of continuously mixing and delivering putty as claimed in claim 1, wherein a sufficiently great pressure is applied to the mixture in said extrusion chamber to raise the temperature of the mixture high enough to assist materially in producing an intimate contact between the constituents.

3. The method of continuously mixing and delivering putty as claimed in claim 1, wherein the mixture is subjected to a smearing and shearing action, as it is forced into at least one of said series of orifices, by the movement across the faces of said orifices of screw means which applies the pressure to the mixture.